H. BALDWIN.
Harvester.
No. 998.
Reissued July 3, 1860.
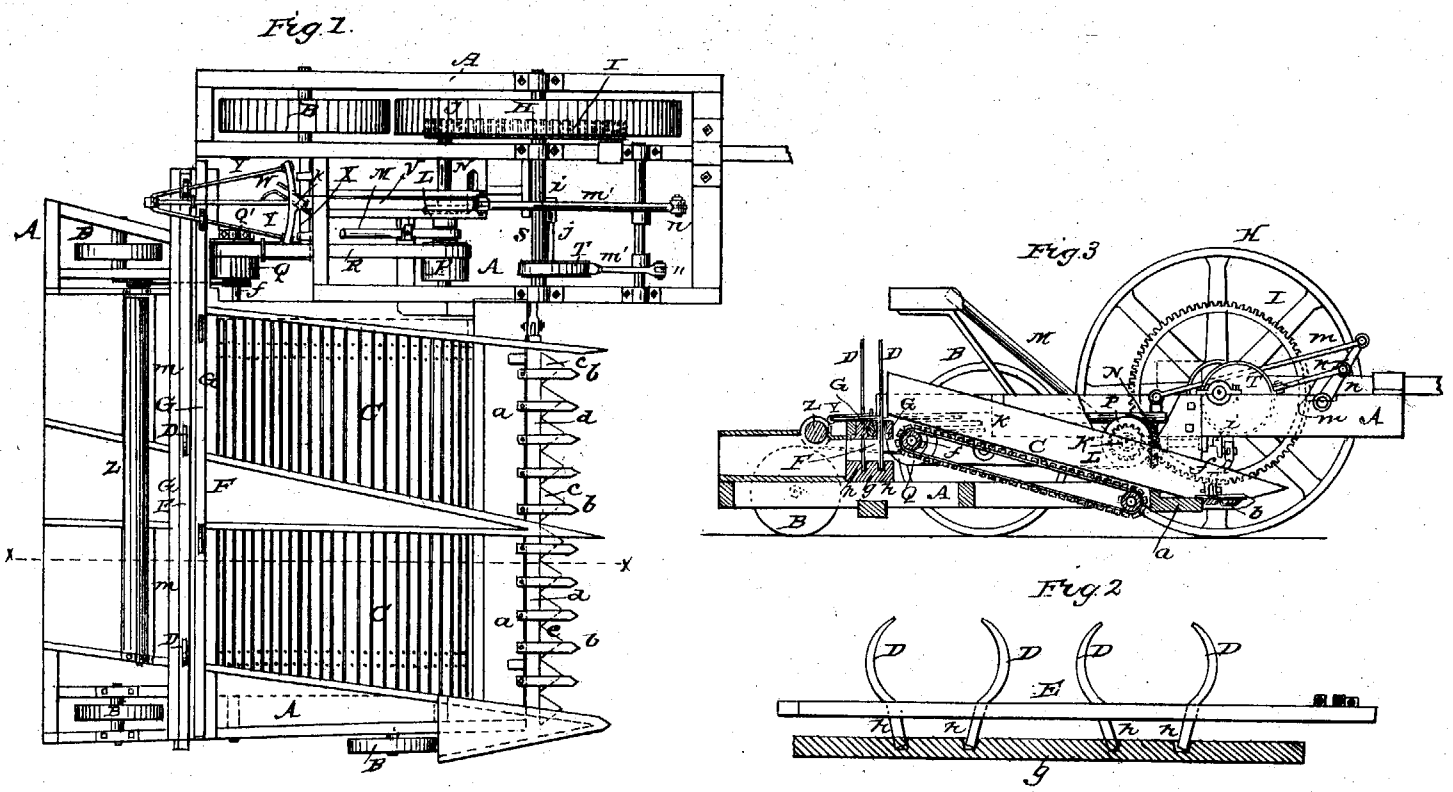
N. PETERS, Photo-Lithographer, Washington, D. C.

UNITED STATES PATENT OFFICE.

H. BALDWIN, JR., OF WASHINGTON, DISTRICT OF COLUMBIA, ASSIGNEE OF J. E. NESEN.

IMPROVEMENT IN HARVESTERS AND BINDERS.

Specification forming part of Letters Patent No. 10,314, dated August 27, 1853; Reissue No. 998, dated July 3, 1860.

DIVISION A.

*To all whom it may concern:*

Be it known that JOSEPH E. NESEN, of Buffalo, in the county of Erie and State of New York, invented certain new and useful Improvements in Reaping and Mowing Machines, of which the following is a full, clear, and exact description, reference being had to the annexed drawings, making a part of this specification, in which—

Figure 1 is a plan or top view of a reaping-machine embracing the said improvements. Fig. 2 is a view of the binding-hooks detached. Fig. 3 is a vertical section of the machine, taken at the line X X of Fig. 1.

The object of the improvement which is the subject of this patent is to gather the cut grain in sheaves for binding, and, when bound, to discharge it from the machine by the mode of operation hereinafter more particularly described.

In the accompanying drawings, A represents the frame of the machine, supported on wheels B B.

The blade *c* of the cutter is scalloped and attached to the cutter-bar *d*, which has a reciprocating motion derived from the motion of the machine, causing the cutter to slide back and forth through the slots in the fingers *b*.

The finger-beam *a*, to which the fingers *b* are fastened, is a strong beam of the usual form.

An endless apron, C, passes over rollers *f*, is slightly inclined, and has an intermittent motion communicated to it in the manner and for the purpose hereinafter explained.

D D D D are binding-hooks arranged in pairs, their lower ends being held stationary in the recesses *h h* in the cross-piece *g* of the frame, and their connection with the sliding rods E F, which have a horizontal reciprocating motion, causing each pair of hooks to alternately approach toward and recede from each other. The sliding rods E F work in stationary grooved guides G G G.

Motion is imparted to the working parts from the driving-wheel H. The requisite reciprocating motion is transmitted from the driving-wheel H to the cutter by means of the spur-wheels I and J, the bevel-wheels L and N, the crank *i*, and the connecting-rod *j*, which is jointed to the end of the cutter-bar *d*. The bevel-wheel L slides on a feather on the shaft K, and can be thrown in and out of gear by the shipper M, thus putting the motion of the cutter under the control of the driver. The endless apron C receives its motion from the wheel H through the spur-wheels I and J, and the band R from the driving-pulley P on the shaft K to the driven pulley Q′ on the roller-shaft *f′* of the apron; and as the band R is shifted alternately from the fixed pulley Q′ to the loose pulley Q by a part of the machine hereinafter described, the motion of the endless apron is intermittent.

On the shaft S of the driving-wheel H is placed an eccentric, T, which, by means of connecting-rods *m′* and rock-arms *n*, gives to the bar V a horizontal reciprocating motion. Projections *k* on the lower surface of the bar V travel between the jaws W and move the shipper X, thus shifting the band R alternately on the pulleys Q and Q′ with the result previously mentioned.

The horizontal reciprocating motion of the rods E F, previously noticed, is derived from the bar V through two side rods, Y, working in eyes *l* on the sliding rods E F. The side rods, Y, are attached at their ends to the bar V, and as they are not parallel to it the horizontal reciprocating motion of the bar V supplies to the rods E F a reciprocating motion at right angles to its own direction, and such that the eyes or lugs *l* alternately approach toward and recede from each other, and this transmits to the binding-hooks D a similar motion, as already described.

The roller Z, which removes the sheaves from the machine after they are bound, is moved by means of a band from a pulley on the shaft *f′*, and its motion is consequently intermittent, and corresponds with that of the endless apron C.

When the machine is in operation its advance imparts to the mechanism the motions already described. The grain is cut by the scalloped blade *c* and falls upon the endless apron C, which at intervals carries it up to the binding-hooks D, when the latter are at their greatest distance apart, and these, then approaching each other, close upon it, compress it into a bundle, and hold it while an attendant, standing on the rear of the machine, passes a band around it and secures it, the bands being placed ready for use in the recesses *m*. When clasped in the binding-hooks D the sheaf rests upon the roller Z, the revolving motion of which is derived from and dependent upon the motion of the endless apron C, and therefore ceases during the nearest approach of the binding-hooks D to each other; but when the hooks D recede and release the sheaf the roller Z revolves and removes the sheaf from the machine at the same time that the apron C carries up grain for another sheaf.

What is claimed under this patent as the invention of the said JOSEPH E. NESEN is—

1. In combination with the cutting apparatus, the endless apron C, having an intermittent motion for the purpose of carrying the cut grain to the binding-hooks at intervals and in proper quantity to form a sheaf, substantially as herein described.

2. The binding-hooks D, or their equivalents, for gathering the cut grain in bundles or sheaves, arranged and operating substantially as herein described.

3. The combination of the endless intermittently-moving apron C with the binding-hooks D, substantially as herein described.

4. The combination of the discharging-roller Z with the apparatus for gathering and compressing the cut grain into sheaves, substantially as herein described.

In testimony whereof I have hereunto subscribed my name.

HENRY BALDWIN, JR.

Witnesses:
W. RENWICK SMEDBERG,
A. E. H. JOHNSON.